United States Patent [19]

Oberst

[11] Patent Number: 4,565,465
[45] Date of Patent: Jan. 21, 1986

[54] CONNECTORS FOR CORRUGATED MATERIALS

[75] Inventor: Steven M. Oberst, St. Charles, Ill.

[73] Assignee: Acorn Box Company, Bedford Park, Ill.

[21] Appl. No.: 573,879

[22] Filed: Jan. 26, 1984

[51] Int. Cl.[4] .............................. B25G 3/00; F16B 7/08
[52] U.S. Cl. .................................. 403/407.1; 403/199;
    403/201; 403/230; 220/22.3; 220/75; 248/222.4
[58] Field of Search ............... 403/407, 199, 187, 235,
    403/245, 232.1, 230, 201, DIG. 10; 248/221.3,
        558, 207, 222.4; 220/22.3, 22.5, 75, 76

[56] References Cited

U.S. PATENT DOCUMENTS

| | | | |
|---|---|---|---|
| 2,103,106 | 12/1937 | Yurkovitch | 248/223.4 |
| 2,703,912 | 3/1955 | Tinnerman et al. | 403/407 |
| 2,879,561 | 3/1959 | Rieder | 403/407 X |
| 3,237,779 | 3/1966 | Eger | 403/230 X |
| 3,399,374 | 8/1968 | Pauza et al. | 403/DIG. 10 |
| 3,403,641 | 10/1968 | Baker | 403/407 X |
| 4,029,038 | 6/1977 | Pfahl | 248/221.3 X |
| 4,068,332 | 6/1978 | Ball et al. | 403/230 X |
| 4,266,882 | 5/1981 | Wilhelmi et al. | 403/407 X |
| 4,340,199 | 7/1982 | Brock | 248/221.3 X |
| 4,376,593 | 3/1983 | Schaefer | 403/231 |
| 4,389,133 | 6/1983 | Oberst . | |
| 4,430,947 | 2/1984 | Kvame . | |

FOREIGN PATENT DOCUMENTS 2010433  6/1979  United Kingdom ................ 403/187

Primary Examiner—Cornelius J. Husar
Assistant Examiner—Todd G. Williams
Attorney, Agent, or Firm—Irwin C. Alter

[57] ABSTRACT

Male and female connectors for connecting corrugated where the male and female connectors form a firm locking relationship by means of protuberances in the female connectors cooperating with locking slots when the flange of the male connector is in locked mating position. Two female connectors can be inverted and locked in mating position by the protuberances cooperating with slots on a respectively mated connector.

6 Claims, 13 Drawing Figures

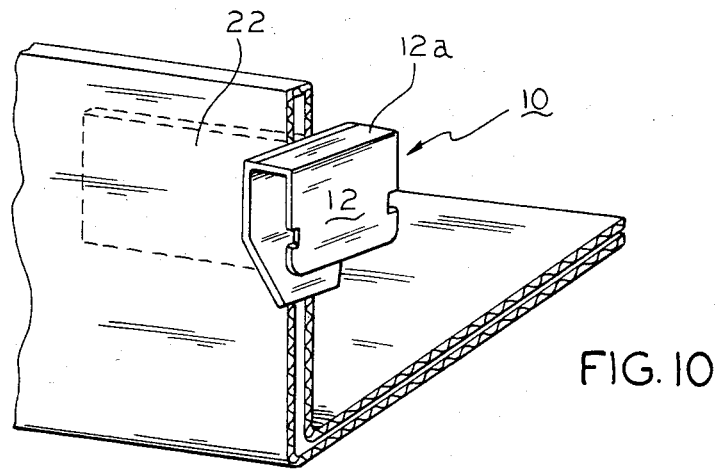
FIG. 10
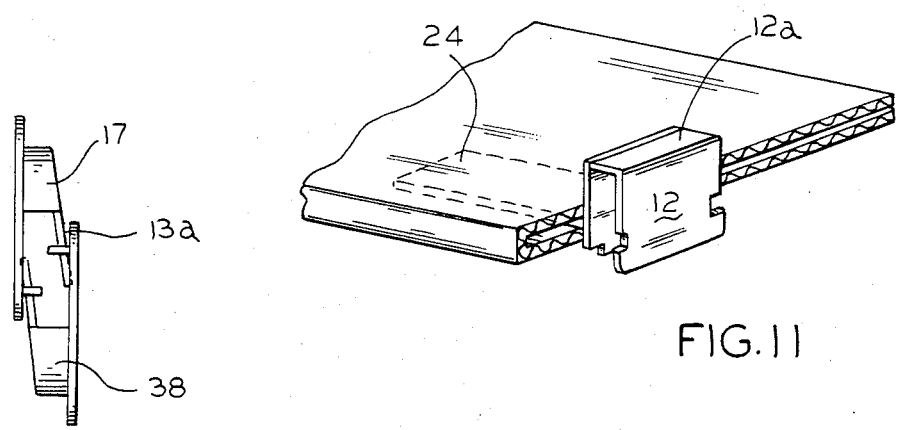
FIG. 13
FIG. 11
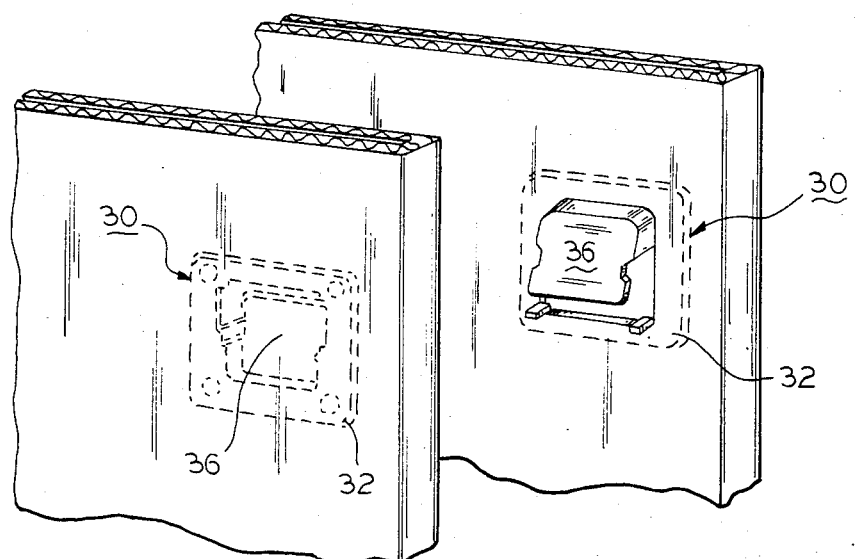
FIG. 12

CONNECTORS FOR CORRUGATED MATERIALS

BACKGROUND OF THE INVENTION

In my previous patent, U.S. Pat. No. 4,389,133, I disclosed plastic connectors that cooperated with corrugated material so that displays and shelf arrangements, as well as modular furniture and other utilitarian items, could be made more easily.

A principal consideration of the invention was to provide connector arrangements with corrugated material which simply and positively interlock adjacent panels and sections of corrugated material. The connectors had sufficient flexibility so that two panels could be supported whether they intersected at substantially right angles or were supported parallel to each other. However, it has been found that a principal drawback to the connectors has been that under certain mechanical application the connectors become disengaged. That is, where the plastic connectors in conjunction with corrugated material have have been pre-packed for knock-down production and the connectors have become disengaged from the product thereby causing considerable inconvenience.

It is therefore a principal object of this invention to accomplish all the objects of the previous invention and in addition thereto provide male and female connectors which do not readily disengage once they are snapped into engagement.

It is a further object of this invention to provide an interconnecting assembly of fasteners wherein either a male and a female fastener could be used or a pair of female fasteners could be used to accomplish the same permanent interlocking arrangement as will be more fully described herein.

SUMMARY OF THE INVENTION

An assembly for intercoupling pieces of corrugated material when constructed in accordance with the present invention can comprise a male and a female connector or a pair of female connectors as will be more fully explained herein.

The female connector includes a flat back portion of a thickness and dimension suitable for insertion between the liners of a corrugated panel. The female connector has a receiving pocket with a receiving opening that is formed of a front wall with curved corners and side walls and a back portion. The side wall of the pocket has curved protuberances on each side thereof proximate to the upper end of the side wall and extending into the pocket, so that the locking protuberances are disposed to cooperate with the flange portion of the male connector member that can be engagingly inserted into interlock position in the pocket for permanent interlocking of the male member with the female member upon insertion.

Alternatively, a pair of female members can be interlocked by inverting one of the female members with relation to the other and inserting each of the front walls of the female members into a respective pocket the other female member. The male member connector includes a flange that has a nose portion with curved corners, curved sides and locking slots formed in the curved sides so that the locking slots are disposed to receive the protuberances to lock the flange into interlocking engagement upon the nose of the flange being inserted into the pocket in a locked position. The male connectors have flat back portions with perpendicular leafs extending therefrom whereby the leafs can be received in another panel of corrugated material and the panels can be coupled at right angles to each other.

BRIEF DESCRIPTION OF THE DRAWINGS

Referring to the drawings wherein like characters of reference indicate corresponding parts throughout:

FIG. 10 is a pictorial view of the male connector of FIG. 1 showing how it engages a piece of corrugated material with its vertical leaf;

FIG. 11 is a pictorial view of a male connector of FIG. 3 showing how its horizontal leaf portion engages a piece of corrugated;

FIG. 12 is a pictorial view illustrating how two flush mounted female connectors can be positioned opposite one another with one of them being inverted and thereafter locked together; and FIG. 13 is a half sectional view showing how the female connectors of FIG. 12 fit together when they have been positioned in mating or interlocking position.

To accomplish the objects of the invention, preferred forms of the male connectors are shown in FIGS. 1 and 3. In FIG. 1, the male connector 10 includes a flange 12 having a nose portion 14 with curved corners 14a and 14b at the end of the nose that connect the sides 16 and 17 to the nose as shown in FIG. 1. The sides 16, 17 respectively, have the locking slots 16a, 17a formed therein. The flange forms a U-shape with a flat back member 20 by means of its upper end 12a that is perpendicular to the back member.

In FIG. 1, flange 12 and back member 20 are connected with a leaf portion 22 that is vertically disposed and extending perpendicular to the flat portion at substantially the center thereof.

Figure 1:
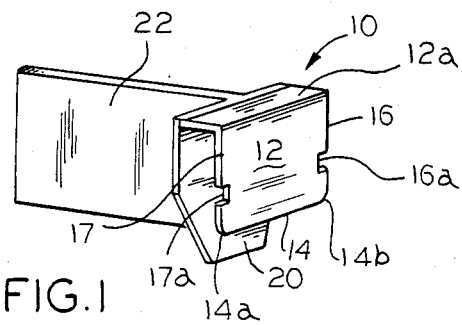
FIG. 1 is a pictorial view depicting a male connector in its inverted position.
Figure 3:
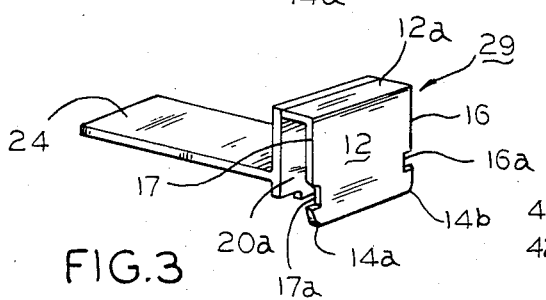
FIG. 3 is a male connector in its inverted position wherein the leaf thereof is horizontal instead of vertical as shown in FIG. 1.

The male connector 29 of FIG. 3 is constructed substantially the same as FIG. 1 with the exception that its leaf 24 is horizontal and the flat back member 20a is shorter since it does not have to accommodate a vertical leaf. Back plate 20a illustrated in FIG. 3, with the exception of not having to accommodate a vertical leaf, functions in exactly the same way as the back plate 20 of the male connector 10 shown in FIG. 1. As seen from the drawings, other than the exceptions noted, the same flange 12 and upper end 12a are components of the connector 29.

Figure 4:
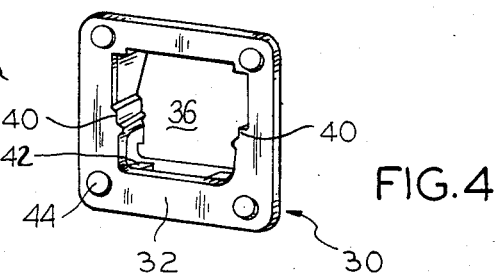
FIG. 4 is a rear perspective inverted view of the female connector of FIG. 2.
Figure 6:
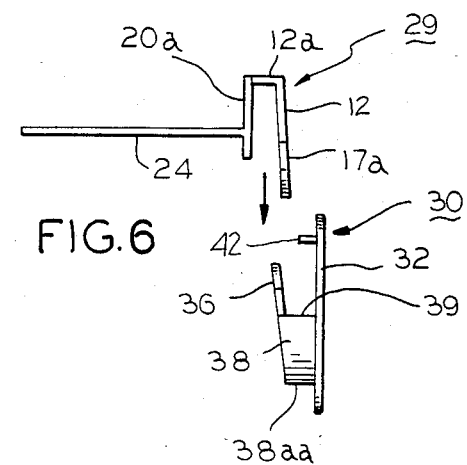
FIG. 6 is a side view of the male connector of FIG. 3 and a female connector about to be engaged.
Figure 5:
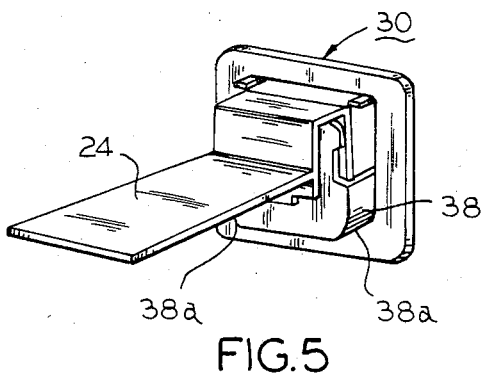
FIG. 5 is a pictorial view of a female connector interconnected with the male connector of FIG. 3 while looking at the front of the female connector.
Figure 7:
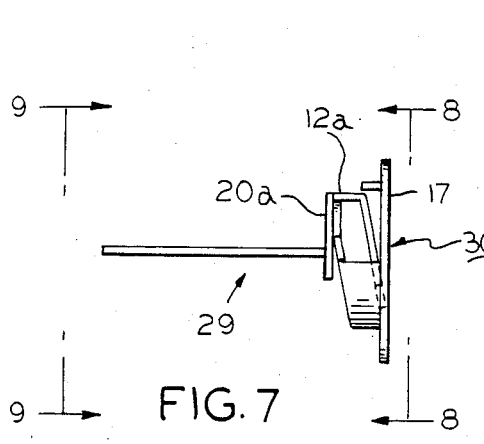
FIG. 7 is a side elevational view of the connector of FIG. 3 in interlocking engagement with a female connector.
Figure 8:
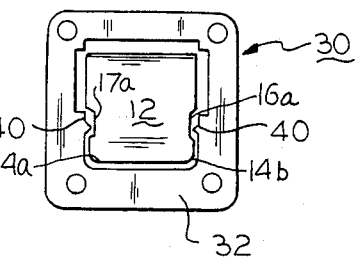
FIG. 8 is a view taken on a plane passing through the line 8—8 of FIG. 7 and looking in the direction of the arrows.
Figure 9:
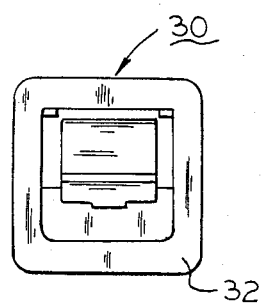
FIG. 9 is a view taken on a plane passing through the line 9—9 in FIG. 7 and looking in the direction of the arrows.

The female connector 30 has a flat back portion 32 and a receiving pocket 39 which is formed of a front wall 36, and sidewalls 38 which have locking protuberances 40 proximate to the two ends of the sidewalls 38 that extend into the pocket as shown pictorially in FIG. 4. As can be seen from FIG. 4, the locking protuberances are disposed to cooperate with the flange portion 12 of the male connecting member by being placed into locking position on insertion of the flange into the open pocket so that the locking slots 16a and 17a retain the locking protuberances 40 as shown in FIGS. 6, 7 and 8. It is noted that the flat front wall 36 is connected to the back wall 32 by the side walls 38 which have the rounded corners 38a so that when the nose 14 of the flange 12 is received in the mating or locking position, the slots 16a, 17a, as well as the corners 14a, 14b of the flange, are retained by respectively contacting the radial corners 14a, 14b and the slots 16a, 17a, as shown in FIG. 8.

Figure 2:
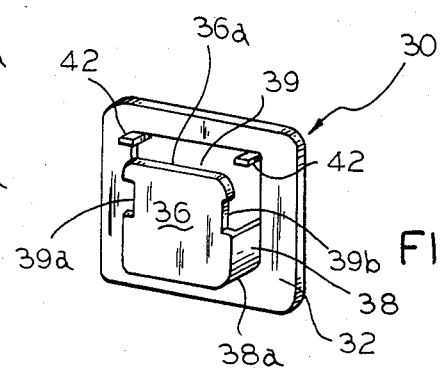
FIG. 2 is a pictorial view of a female connector that can be engaged into mating position with the male connector of FIG. 1.

A minimum of friction is encountered when the connectors are locked due to the fact that the protuberances 48 have rounded curved edges and when they make contact with the inserted flange 12 with the nose 14 and rounded corners 14a, 14b, the flange and pocket are placed in locking position with the aid of the rounded surfaces. In order to create a firmer locking effect for the connectors, the front flange 12 as well as the front wall 36 is shown as being skewed in relation to the back wall 32 to provide a biasing locking effect by a biasing pressure on the flange 12. As seen from FIGS. 2 and 3, the side wall 38 terminates at each end thereof to form the upper sides of the pocket 39. The front wall 36, in addition to having the locking slots 39a and 39b as shown in FIG. 2, has a nose 36a that is rounded at the corners so that the front wall 36 can function as a flange 12 as seen in FIG. 13 where one of the female connectors has been inverted and inserted into interlock position as in FIG. 10. Additional features of the back plate 32 include the locating pins 42 which extend from the front of the plate as seen in FIG. 2 so that when the fasteners are in mating position they are prohibited from rotating with respect to one another since the flange would make contact with the pins 42 on rotation. Also, the rear of the back plate 32 has the friction members 44 that are placed at each corner thereof so that when the female connectors are flush mounted and inserted in the corrugated as illustrated in FIG. 12, they are more securely kept in position once inserted in the corrugated.

As seen from FIGS. 10 and 11, the male connectors, by having the leafs 22 and 24 in either the vertical or horizontal position, enables them to be secured into the corrugated regardless of whether it is necessary to associate the male connector to a vertical piece of corrugated or a horizontally located piece of corrugated, since in both cases the same assembly technique of inserting the leaf of the male connector into a corrugated piece is used. In my previous U.S. Pat. No. 4,389,133 the assembly technique used is discussed and explained and those skilled in the art can appreciate how to achieve the assembly. In the same substantial way, the flat back portion 32 is secured in a corrugated piece and the mounting is illustrated in FIG. 12.

As was true of my other patented invention, the connectors can be formed of a plastic material such as high impact styrene or polypropylene. However, those skilled in the art will understand that other materials of similar properties can be used in the production of the connectors according to this inventin.

Thus, it can be seen from a reading of the specification and drawings that the objects of the invention are fulfilled by providing a male and female connector that is not only as versatile as my previous invention, but it is also one that can accomplish a permanent interlocking or mating arrangement so that once the male and female are mated and snapped into engagement, they will not readily become disengaged.

While only preferred embodiments of the invention have been described and claimed herein, it is manifest that various alterations and modifications may be made therein within the spirt of the invention. It is therefore the intention of the appended claims to cover all such modifications and all alterations as may fall within the true spirit and scope of this invention.

What is claimed is:

1. A female connector for attachment to a first piece of corrugated material and also for attachment to another connector which is carried on a second piece of corrugated material, to securely and removably hold two pieces of corrugated material together, said female connector comprising:
   a back portion for attachment to corrugated material;
   a front wall, and sidewalls attached to said front wall and said back portion to define a receiving pocket having an open top, said sidewalls defining locking protuberances on each side of the pocket that extend into said pocket, said front wall being in non-parallel, skewed relation with said back portion, whereby said locking protuberances are positioned to cooperate with a flange portion of another connector having locking slots which enters said receiving pocket.

2. The female connector of claim 1 in which said back portion is secured to a first piece of corrugated material, said female connector being in locking relation with a male connector which comprises a U-shaped flange, the forward portion of said flange being positioned in locking relation with said locking protuberances in said pocket, said U-shaped flange also defining a rearward portion which carries, in normal relation thereto, a flat leaf extending outwardly from said flange, said flat leaf being positioned within a second piece of corrugated material and in adhering relation thereto, whereby the two pieces of corrugated material are locked together.

3. The female connector and attached male connector of claim 2 in which the forward portion of said U-shaped flange is in skewed, non-parallel relation to the rearward portion thereof, whereby the skewed front wall of the female connector and the skewed, forward portion of the male connector exert a biasing, locking effect by biasing pressure between the attached connectors.

4. The female connector and the connected male connector of claim 3 in which the outer portion of the flange of the male connector defines a nose portion with rounded corners and a pair of opposed locking slots positioned adjacent said nose portion on opposed, lateral edges of the forward portion of said flange, said locking slots being disposed to receive said protuberances to lock said flange in said receiving pocket.

5. The female connector of claim 1, said connector being in attached relation to a first piece of corrugated material, a second connector attached to a second piece of corrugated material, said second connector defining a second front wall, second sidewalls, and a second back portion to define a second receiving pocket having an open top, the respective front wall of each connector defining a flange fitting in the receiving pocket defined by the other connector for locking of the connectors and their respective pieces of corrugated material together.

6. The female connector of claim 5 in which the second receiving pocket of the second connector also defines locking protuberances disposed to cooperate with the front wall of said female connector, whereby both front walls are held in locking relation by the respective protuberances of the other connector, the second front wall being in non-parallel, skewed relation to said second back portion, whereby both front walls are positioned to create a biasing pressure, each against the other connector, to achieve a locking effect.

* * * * *

UNITED STATES PATENT AND TRADEMARK OFFICE
CERTIFICATE OF CORRECTION

PATENT NO. : 4,565,465
DATED : January 21, 1986
INVENTOR(S) : Steven M. Oberst

It is certified that error appears in the above-identified patent and that said Letters Patent are hereby corrected as shown below:

Col. 3, line 24    "48" should be --40--.

Col. 4, line 3     "inventin" should be --invention--.

Signed and Sealed this

Twenty-second Day of July 1986

[SEAL]

Attest:

DONALD J. QUIGG

Attesting Officer

Commissioner of Patents and Trademarks